March 10, 1936.　　　J. O. LEWIS　　　2,033,142
COUPLING DEVICE
Filed Sept. 9, 1933
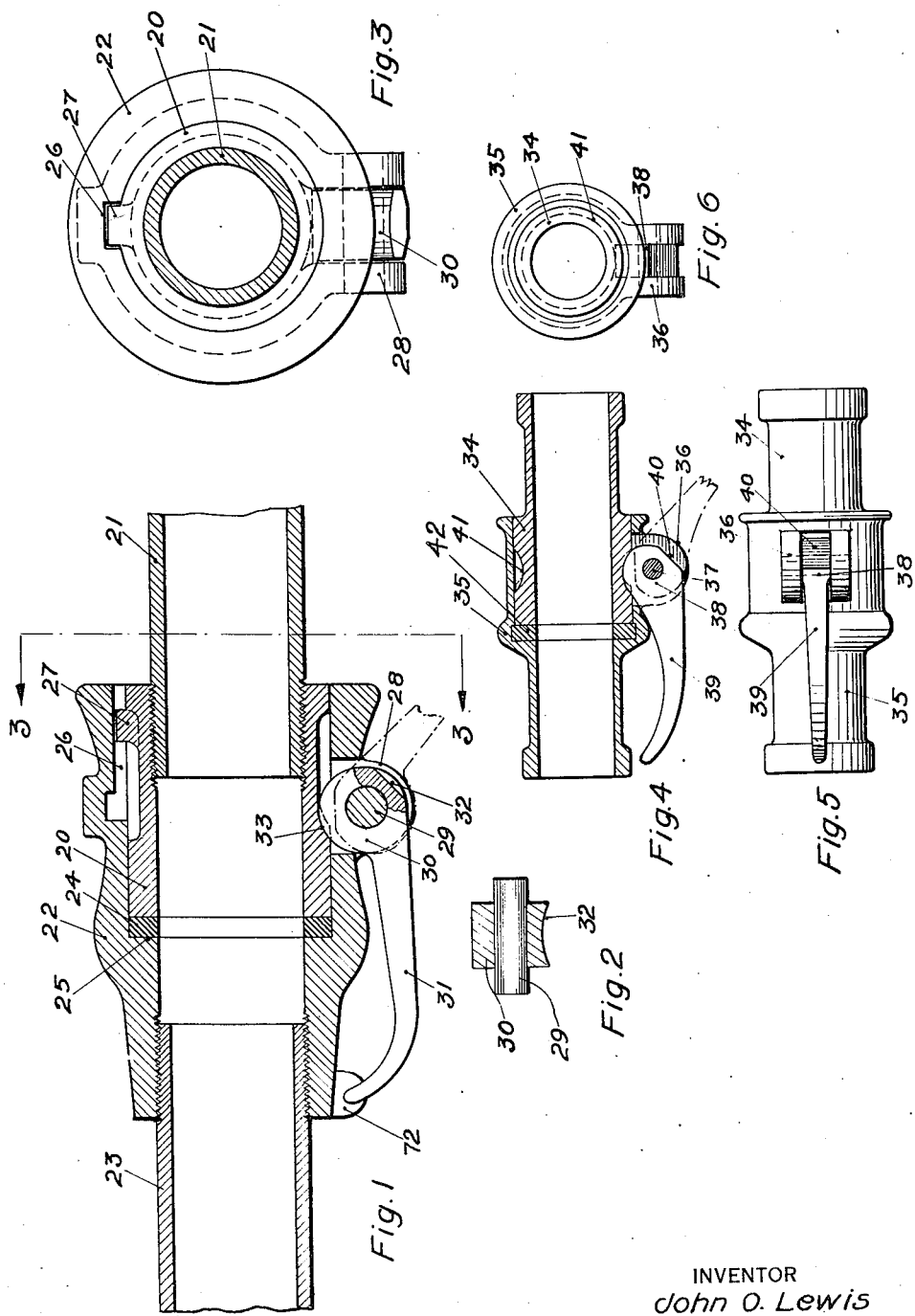
INVENTOR
John O. Lewis
BY
　　　　　
ATTORNEY Patented Mar. 10, 1936

2,033,142

UNITED STATES PATENT OFFICE 2,033,142

COUPLING DEVICE

John O. Lewis, Brooklyn, N. Y., assignor to Universal Fire Appliance Corporation, a corporation of New York Application September 9, 1933, Serial No. 688,709

2 Claims. (Cl. 285—170)

This invention relates to improvements in coupling devices suitable for coupling hose and the like, but which may be used for coupling conduit of any description, and has for its object the provision of a quick detachable coupling which may be employed for any purpose where such couplings are desirable.

A further object is to provide a coupling that can be easily and cheaply manufactured from die castings or the like and a still further object is to provide a coupling that will withstand as great or a greater pressure than that applied to the conduit of which the coupling is used.

Other objects of the invention will be apparent from the following specification, the invention consisting substantially in the construction, combination, location and relative arrangements of parts, all as will be more fully hereinafter set forth, as shown by the accompanying drawing and finally pointed out in the appended claims.

In the accompanying drawing which shows by way of illustration, certain embodiments of the invention:

Figure 1 is a longitudinal section of a quick action hose coupling suitable for large hose;

Figure 2 is a cross section of the clamping cam of the coupling, Figure 1;

Figure 3 is a section of the coupling on the lines 3—3, Figure 1;

Figure 4 is a longitudinal section of a modified coupling suitable for small hose;

Figure 5 is a bottom exterior view of the coupling, Figure 4; and

Figure 6 is a right end elevation of the coupling, Figure 4.

Referring to Figures 1, 2 and 3, the numeral 20 denotes a male coupling member having an extension 21 adapted to be attached to a hose. A female coupling member 22 has a similar extension 23. A washer 24 of rubber or other resilient material is adapted to be compressed between the end of male member 20 and a shoulder 25 of female member 22.

The numeral 26 denotes an interior groove in member 22 in which is slidable a key 27 formed on member 20.

Lugs 28 on member 22 support a pin 29 on which is rotatably mounted a cam 30 having an integral arm or handle 31. The numeral 32 denotes a cutaway portion of cam 30. A curved face 33 on member 20 is adapted to engage cam 30.

Referring to Figures 4, 5 and 6, the numeral 34 denotes the male fitting, 35 the female fitting, 36 the lugs formed on fitting 35, 37 the cam pin, 38 the cam and 39 the cam lever. The cam 38 has a cut-away portion 40.

A circumferential groove 41 formed on male fitting 34 is adapted to engage cam 38. The numeral 42 denotes a resilient sealing washer.

The numeral 72, Figure 1, denotes a guard for the end of lever 31 when the latter is in locked position.

The operation of the device is as follows:

To couple hose fastened to 21 and 23, Figure 1, the lever 31 is swung to the right, revolving the cam 30 as shown in dotted lines. The member 20 is inserted in member 22, the cut away portion 32 of cam 30 permitting member 20 to slide in against washer 24. Lever 31 is now swung to the left. Cam 30 engages curved face 33, forcing the male member to the left, compressing the washer 24 and locking the parts together. It will be noted that internal pressure or external pull tending to separate the parts acts in a direction tending to tighten the cam engagement, thus preventing accidental loosening.

The function of the groove 26 and key 27 is to determine the circumferential registry of cam 30 with curved face 33.

The operation of the coupling shown in Figures 4, 5 and 6 is the same as described, except that the cam 38 can engage any point in the circumferential groove 41, no locating key being required with this construction.

The advantage of the cams as shown in Figures 1 and 4, which act in such a direction that a tendency for the parts to separate only holds the cams more securely locked, is also obvious in fire service where dragging of hose and high internal pressures tend to force couplings apart. This locking tendency is especially valuable in a fitting subject to long use and hard service under which ordinary clamping means tend to loosen and release, due to wear.

It is obvious that any of the types of couplings shown may be used to join solid conduits such as electrical cables.

Although the invention has been disclosed in connection with specific details of preferred embodiments thereof, it must be understood that such details are not intended to be limitative of the invention except in so far as set forth in the accompanying claims.

What is claimed is:

1. A conduit coupling comprising a tubular male member having one end thereof faced to form a seat and formed with an external annular concave groove adjacent to said faced end, a female member including a tubular portion having an internal shoulder, a gasket on said shoulder on which said faced end of the male member may seat, a cam shaft mounted on said female member at right angles to the central axis of the coupling, a cam carried by said shaft, and a handle formed integral with said cam adapted to be manually operated to cause the cam to engage a concave surface of said groove at any point about its annular contour and to force and retain the faced end of the male member and the shoulder in said female member into sealing relation with said gasket therebetween.

2. A conduit coupling, comprising a female member including a tubular portion one end of which is faced to form a shoulder and a second tubular portion of larger diameter than said first portion, said shoulder forming a bottom for said second portion; a slot formed in the wall of said second portion; lugs on said second portion, one on each side of said slot; a cam shaft supported by said lugs at right angles to the axis of said member; a cam carried by said shaft; a lever integral with said cam; said cam having a curved surface which extends into said second portion via said slot when the lever is in one position and a flat portion which is substantially flush with the interior of said second portion when the lever is in another position; a gasket positioned in said second portion against said shoulder; a male member having one end thereof faced to form a seat and formed with an annular concave groove adjacent to the faced end; the curved surface of said cam being adapted to engage a concave wall of said groove at any point about its annular contour and to clamp said faced end of said male member against said gasket when the lever is in the first position mentioned; and said flat portion of the cam permitting said members to be disengaged when said lever is moved to said second position.

JOHN O. LEWIS.